United States Patent
McCarthy et al.

(10) Patent No.: US 6,498,955 B1
(45) Date of Patent: Dec. 24, 2002

(54) MEMBER PREFERENCE CONTROL OF AN ENVIRONMENT

(75) Inventors: Joseph Francis McCarthy, Libertyville, IL (US); Theodore Dean Anagnost, Darien, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/272,795

(22) Filed: Mar. 19, 1999

(51) Int. Cl.$^7$ ............................................. G05B 15/00
(52) U.S. Cl. ........................................... 700/1; 700/275
(58) Field of Search ................................. 700/275, 276, 700/299, 278, 1

(56) References Cited

U.S. PATENT DOCUMENTS

| | | | |
|---|---|---|---|
| 3,866,173 A | | 2/1975 | Moorman et al. |
| 4,407,447 A | * | 10/1983 | Sayegh ........................ 165/205 |
| 4,591,248 A | | 5/1986 | Freeman |
| 4,724,307 A | | 2/1988 | Dutton et al. |
| 4,896,209 A | | 1/1990 | Matsuzaki et al. |
| 4,908,748 A | | 3/1990 | Pathak et al. |
| 5,086,385 A | * | 2/1992 | Launey et al. ................. 700/83 |
| 5,131,048 A | * | 7/1992 | Farenelli et al. ............... 381/81 |
| 5,156,203 A | | 10/1992 | Funakoshi et al. |
| 5,170,935 A | * | 12/1992 | Federspiel et al. ........ 236/44 C |
| 5,373,146 A | | 12/1994 | Lei |
| 5,416,694 A | | 5/1995 | Parrish et al. |
| 5,436,852 A | * | 7/1995 | Kon ............................ 700/276 |
| 5,537,586 A | | 7/1996 | Amram et al. |
| 5,583,763 A | | 12/1996 | Atcheson et al. |
| 5,615,134 A | * | 3/1997 | Newsham et al. ........... 700/276 |
| 5,661,787 A | | 8/1997 | Pocock |
| 5,682,196 A | | 10/1997 | Freeman |
| 5,682,525 A | | 10/1997 | Bouve et al. |
| 5,710,700 A | | 1/1998 | Kurtzberg et al. |
| 5,761,604 A | | 6/1998 | Stough |
| 5,762,265 A | * | 6/1998 | Kitamura et al. ............ 165/205 |
| 5,805,443 A | * | 9/1998 | Raffray et al. ............... 235/375 |
| 5,835,715 A | | 11/1998 | Dahl |
| 5,848,398 A | | 12/1998 | Martin et al. |
| 5,864,579 A | | 1/1999 | Briskman |
| 5,870,740 A | | 2/1999 | Rose et al. |
| 6,084,516 A | * | 7/2000 | Yasushi et al. .......... 340/573.1 |
| 6,263,260 B1 | * | 7/2001 | Bodmer et al. .............. 700/275 |

FOREIGN PATENT DOCUMENTS

EP      0 658 997 B1      3/2001

OTHER PUBLICATIONS

R. Want et al.: "An Overview of the ParcTab Ubiquitous Computing Experiment," *IEEE Personal Communications*, vol. 2, No. 6, Dec. 1995, pp. 28–43.

* cited by examiner

*Primary Examiner*—Thomas Black
*Assistant Examiner*—Edward F. Gain, Jr.
(74) *Attorney, Agent, or Firm*—Brinks Hofer Gilson & Lione

(57) ABSTRACT

A system is disclosed that enables intelligent environments comprised of physical spaces that sense and respond to the people and events taking place in them to dynamically influence environmental factors that affect them, such as the lighting, temperature, décor or background music. An intelligent environment in accordance with one embodiment of the present invention controls the selection of music played in a fitness center. Two different algorithms are utilized to arbitrate preferences in a shared environment: one seeks to maximize the average satisfaction of the inhabitants, the other seeks to maximize the equitable distribution of satisfaction among the inhabitants. The resultant system is an approach that affords effective environmental control.

28 Claims, 12 Drawing Sheets

| Rating | Interpretation |
|---|---|
| +2 | I *love* this music |
| +1 | I *like* this music |
| 0 | I *don't know* / *don't care about* this music |
| -1 | I *dislike* this music |
| -2 | I *hate* this music |

FIGURE 2

| $i$ | Genre | Person A | B | C | D | E | $GP_i$ | $Pr_i$ |
|---|---|---|---|---|---|---|---|---|
| 1 | Alternative Rock | 2 | 2 | 0 | 2 | 2 | 68 | 0.48 |
| 2 | Hottest Hits | 1 | 1 | 2 | 0 | -2 | 38 | 0.27 |
| 3 | New Music | 1 | 1 | 1 | 0 | 0 | 35 | 0.25 |
| 4 | Hot Country | 2 | 0 | 0 | 0 | -2 | 28 | 0.00 |
| 5 | Dance | 2 | -1 | 1 | -1 | -1 | 28 | 0.00 |
| 6 | World Beat | 0 | 1 | -1 | 1 | -2 | 23 | 0.00 |
| 7 | Traditional Country | 1 | 0 | 0 | -2 | -2 | 17 | 0.00 |
| 8 | 50's Oldies | 0 | 0 | -1 | -1 | -1 | 14 | 0.00 |
| 9 | Heavy Metal | -1 | -1 | -1 | -1 | -2 | 4 | 0.00 |
| 10 | Polka | -1 | -1 | -2 | -2 | -2 | 2 | 0.00 |

FIGURE 3

| Station | Percent of Total Airtime |
|---|---|
| Alternative Rock | 14.3 |
| Album Rock | 9.0 |
| Power Hits | 8.6 |
| Classic Rock | 7.9 |
| Hit Sweep | 7.7 |
| 80's Music | 7.6 |
| Hottest Hits | 7.5 |
| Dance | 6.5 |
| New Music | 4.4 |
| Adult Contemporary | 3.6 |

FIGURE 7

| i | Genre | Person A | B | C | D | E | $GP_i$ | $Pr_i$ |
|---|---|---|---|---|---|---|---|---|
| 1 | Alternative Rock | 2 | 2 | 2 | -1 | -1 | 50 | 0.42 |
| 2 | Hottest Hits | 2 | 1 | 1 | 0 | -2 | 38 | 0.32 |
| 3 | New Music | 1 | 1 | 1 | -2 | 0 | 31 | 0.26 |
| 4 | Dance | 0 | 0 | -1 | 2 | -1 | 26 | 0.00 |
| 5 | Hot Country | 0 | 0 | -2 | -1 | 2 | 25 | 0.00 |
| 6 | World Beat | 0 | 1 | -1 | -1 | -2 | 15 | 0.00 |
| 7 | Traditional Country | -1 | 0 | -1 | 1 | -2 | 15 | 0.00 |
| 8 | 50's Oldies | 0 | 0 | -1 | -1 | -1 | 11 | 0.00 |
| 9 | Heavy Metal | -1 | -1 | -2 | -2 | -2 | 4 | 0.00 |
| 10 | Polka | -1 | -1 | -2 | -2 | -2 | 2 | 0.00 |

FIGURE 8

| Total Satisfaction | | | Gini Coefficient | | |
|---|---|---|---|---|---|
| Max-Sat | Equitable | % change | Max-Sat | Equitable | % change |
| 7000 | 5776 | -17.5% | 0.26 | 0.01 | 94.2% |

FIGURE 10

|  | Total Satisfaction | | | Gini Coefficient | | |
|---|---|---|---|---|---|---|
| Epoch | Max-Sat | Equitable | % change | Max-Sat | Equitable | % change |
| 1 | 14000 | 12521 | -10.6% | 0.19 | 0.10 | 50.5% |
| 2 | 15500 | 13624 | -12.1% | 0.19 | 0.11 | 39.9% |
| 3 | 14500 | 13162 | -9.2% | 0.22 | 0.13 | 41.8% |
| 4 | 14000 | 12713 | -9.2% | 0.23 | 0.15 | 34.7% |
| 5 | 12000 | 10825 | -9.8% | 0.30 | 0.10 | 68.3% |
| 6 | 14500 | 11243 | -22.5% | 0.19 | 0.08 | 56.0% |
| 7 | 15000 | 12830 | -14.5% | 0.16 | 0.15 | 5.4% |
| 8 | 15000 | 12564 | -16.2% | 0.19 | 0.15 | 20.5% |
| 9 | 14500 | 11939 | -17.7% | 0.19 | 0.10 | 49.6% |
| 10 | 13000 | 11851 | -8.8% | 0.28 | 0.12 | 59.6% |
| Average | 14200 | 12327 | -13.1% | 0.21 | 0.12 | 42.6% |

FIGURER 11

| Total Satisfaction | | | Gini Coefficient | | |
|---|---|---|---|---|---|
| Max-Sat | Equitable | % change | Max-Sat | Equitable | % change |
| 6767 | 5953 | -12.0% | 0.14 | 0.09 | 31.9% |

FIGURE 12

MEMBER PREFERENCE CONTROL OF AN ENVIRONMENT

FIELD OF THE INVENTION

The present invention relates to environmental factors affecting an environment at any given time, and more particularly to a group preference arbitration system that allows the members of a group environment to influence, but not directly control, the selection of these factors of a group environment in a harmonious manner.

BACKGROUND OF THE INVENTION

When building an environmental control system, most systems focus on how an environment can sense and respond to a single individual. For example, Michael H. Coen. 1997. Building Brains for Rooms: Designing Distributed Software Agents. In *Proceedings of the Ninth Conference on Innovative Applications of Artificial Intelligence* (IAAI 97). 971–977. Menlo Park, Calif.: AAAI Press; Jeremy R. Cooperstock, Sidney S. Fels, William Buxton, and Kenneth K. Smith. 1997. Reactive Environments: Throwing Away Your Keyboard and Mouse. *Communications of the ACM* 40(9): 65–73; Lori Faith Craynor. 1996. Declared-Strategy Voting: An Instrument for Group Decision-Making. Ph.D. Dissertation. Washington University; Andrew Dahley, Craig Wisneski and Hiroshi Ishii. Water Lamp and Pinwheels: Ambient Projection of Digital Information into Architectural Space (short paper), in Summary of Conference on Human Factors in Computing Systems (CHI '98), (Los Angeles, April 1998), ACM Press, pp. 269–270; Scott Elrod, Gene Hall, Rick Costanza, Michael Dixon, and Jim Des Rivieres. 1993. Responsive Office Environments. *Communications of the ACM* 36(7): 84–85; Jorg Geibler. Shuffle, Throw or Take It!: Working Efficiently with an Interactive Wall. In ACM Conference on Human Factors in Computing Systems (CHI '98), Late-Breaking Results: "The Real and the Virtual: Integrating Architectural and Information Spaces (Suite)". Los Angeles, Calif., Apr. 18–23, 1998. CHI'98 Summary. Pp. 265–266; Andy Harter and Andy Hopper. 1994. A Distributed Location System for the Active Office. *IEEE Network* 8(1): 62–70; Andy Hopper, Andy Harter, and Tom Blackie. 1993. The Active Badge System. In *Proceedings of the Conference on Human Factors in Computing Systems* (InterCHI 93); Joseph F. McCarthy and Theodore D. Anagnost. 1998. MusicFX: An Arbiter of Group Preferences for Computer Supported Collaborative Workouts. To appear in *Proceedings of the ACM 1998 Conference on Computer Supported Cooperative Work* (CSCW '98); David W. Pearce (ed.), The MIT Dictionary of Modern Economics, 1992, MIT Presss, Cambridge, Mass.; Norbert A. Streitz, Jorg Geibler and Torsten Holmer. 1998. Roomware for Cooperative Buildings: Integrated Design of Architectural Spaces and Information Spaces. In N. Streitz, S. Konomi, H. Burkhardt (eds.), Cooperative Buildings—Integrating Information, Organization, and Architecture. Proceedings of CoBuild '98, Darmstadt, Germany. Lecture Notes in Computer Science, Vol. 1370. Springer: Heidelberg, 1998, pp. 4–21; Roy Want, Bill N. Schilit, Norman I. Adams, Rich Gold, Karin Petersen, David Goldberg, John R. Ellis, and Mark Weiser. 1995. An Overview of the ParcTab Ubiquitous Computing Experiment. *IEEE Personal Communications* 2(6): 28–43; Mark Weiser and John Seely Brown. The Coming Age of Calm Technology. In Beyond Calculation: The Next Fifty Years of Computing. Springer-Verlag, 1997, pp. 75–85; and Craig Wisneski, Hiroshi Ishii, Andrew Dahley, Matt Gorbet, Scott Brave, Brygg Ullmer and Paul Yarin. Ambient Displays: Turning Architectural Space into an Interface between People and Digital Information. In Proceedings of the International Workshop on Cooperative Buildings (CoBuild '98). Darmstadt, Germany, February 1998. Springer Press, pp. 22–32. These articles describe systems that have attempted to address the problem of tuning an environment.

Further related research is as follows:

(1) The Olivetti Active Badge™ system [Hopper, et al., 1993; Harter and Hopper, 1994] provides a mechanism for locating and tracking individuals throughout a building using infrared badges and a network of transceivers. The system, as originally designed, did not include a representation of preferences, and was primarily focused on how artifacts (computers, doors, or telephones) might respond to an individual rather than a group. This technology could be quite useful in the present invention, since it would eliminate the need for a manual login or a preset timeout to trigger entrance and exit events—the system could simply poll periodically for the presence of active badges in the fitness center and locker rooms.

(2) The Xerox ParcTab system [Want, et al., 1995] also provides a mechanism for locating and tracking people who are carrying a handheld device. One application allows individual inhabitants of a room to vote on the quality or pace of a presentation using their ParcTab; the presenter can then respond to this feedback, but the environment itself does not respond to voting. A ParcTab could be used to control the lighting or temperature of a room—similar to changing channels with a television remote control device—but it does not appear that the designers were concerned with using this functionality in rooms with multiple inhabitants.

(3) The Responsive Environment Project at Xerox [Elrod, et al., 1993] explored how an environment might conserve energy by adjusting the lighting and temperature, based on an awareness of who was present (or scheduled to be present) in offices and common areas within a building. This work differs from the present invention in that it was basically a two-state system—an office or common area was either empty or non-empty—and the preferences of the inhabitants was not considered in its control strategy.

(4) The Intelligent Room at MIT [Coen, 1997] is able to track multiple inhabitants in the room, and supports a number of methods for inhabitants to give commands to the room. While it has some capability for noting individual preferences (e.g., not playing Mozart as someone is dozing), it has no explicit mechanism for arbitrating among preferences of a group of people.

(5) The Reactive Room [Cooperstock, 1997] is a shared telepresence environment which responds to its inhabitants, and has a mechanism for storing preferences for videoconference equipment usage. This work focuses on a very difficult problem—how a shared virtual environment might better adapt to its inhabitants, when the inhabitants are distributed across multiple physical sites. One way that the room reacts is to adjust a remote camera based on someone leaning left or right; however, it's not clear how the room would react to different people leaning in different directions simultaneously.

(6) Cooperstock, et al. [1997], posit four important factors that affect any intelligent environment: the invisibility of the technology, the capability of manually overriding the system, a mechanism for providing feedback to users, and an ability to adapt to the preferences of users. The present invention meets all four of these criteria: other than requiring manual login, the system does not require conscious interaction on the part of the group environment members, e.g., requiring people to input their preferences each time (or voting on each song); the group environment staff can manually override the station selected by the system at any time; the primary feedback that the system provides is in the selection of music played, but the system also provides some feedback to each member with respect to how well the member's preferences align with those of the current group; finally, the system's primary purpose is to continually adapt to the preferences of a changing group of people working out in the group environment.

SUMMARY OF THE INVENTION

The present invention serves for allowing preferences of members of a group environment to influence the control of an element in the group environment. In the most simple of terms, the present invention includes a member detector, a storage medium and a controller. In use, the member detector provides an indication of which members are present in the group environment and the storage medium is adapted for storing the preferences of the members. Further, the controller serves for controlling the element of the group environment in a way that is dependent on the preferences of the members for the purpose of best meeting the preferences of the members.

It should be noted that the element may take on various modes that may be selected by the controller to meet the preferences of the members of the group environment. Ideally, the preferences each include a numerical indicator representative of a preference for each mode. These numerical indicators may be acquired from the members of the group environment by any type of survey or the like. In order to control the element within the environment, the controller first sums the preferences of each person for each station, yielding a group preference (GP) value for each station; then the system sorts the stations from most popular to least popular, marks the first M stations as candidates (where M is also known as the group preference filter (GPF) a parameter set by the staff), removes from consideration any stations for whom any single individual has a preference below the threshold established by the individual preference filter (IPF, another staff-settable parameter))—e.g., if this is set to −1, any station for which any single individual has specified a preference of −2 will be eliminated from consideration—and then randomly selects one of the remaining stations, where the probability of randomly selecting any particular station is governed by its GP value—e.g., a station with a GP value of 50 is twice as likely as to be selected as a station with a GP value of 25.

To accommodate the situation wherein one or more of the members leaves or arrives, the controller changes the element of the group environment to best meet the preferences of the members that are present within the group environment. Detection of the departure or arrival of a new member may be afforded by any user interface such as a card reader connected to the system which allows the identification of any member who leaves or arrives within the group environment.

In one embodiment, the element within the group environment include audible signals in the form of music. In such embodiment, the controller may control the music by way of a juke box. The modes correspond to various genres of the music, i.e. alternative rod, hottest hits, new music, hot country, dance, world beat, traditional country, 50's oldies, heavy metal, polka, etc.

According to a broad aspect of a preferred embodiment of the invention, environmental factors affecting shared spaces are typically designed to appeal to the broadest audiences they will serve while ignoring the preferences of the inhabitants found in the environment at any given time. Examples of such factors include the lighting, temperature and décor in the common areas of an office building. In accordance with one embodiment of the present invention, a group preference arbitration system is disclosed that facilitates members of a fitness center influencing, but not directly controlling, the selection of music in a group environment, such as a fitness center. The system has a database of members' preferences for a wide range of musical genres, a mechanism for identifying who is present at any given time, and an algorithm for selecting a musical genre that will promote members' listening pleasure in an optimal manner.

DESCRIPTION OF THE DRAWINGS

The foregoing and other objects, aspects and advantages are better understood from the following detailed description of a preferred embodiment of the invention with reference to the drawings, in which:

FIG. 2 is a chart providing an interpretation for each of various levels of preference between the various members of a group environment;

FIG. 3 is a chart depicting a set of sample preferences for five people (A through E) and ten musical genres;

FIG. 7 is a chart depicting the top 10 most frequently played stations during an experiment associated with the present invention, along with the percentage of time those stations were played;

FIG. 8 is a chart of data which is used in an experiment with the present invention that presents the behavior of associated algorithms;

FIG. 10 is a chart of the statistics for the performance of two algorithms on this data set of FIG. 8;

FIG. 11 is a chart summarizing the results of 10 epochs of an experiment associated with the present invention; and FIG. 12 is a chart showing the results of yet another experiment associated with the present invention.

DETAILED DESCRIPTION

Figure 1:
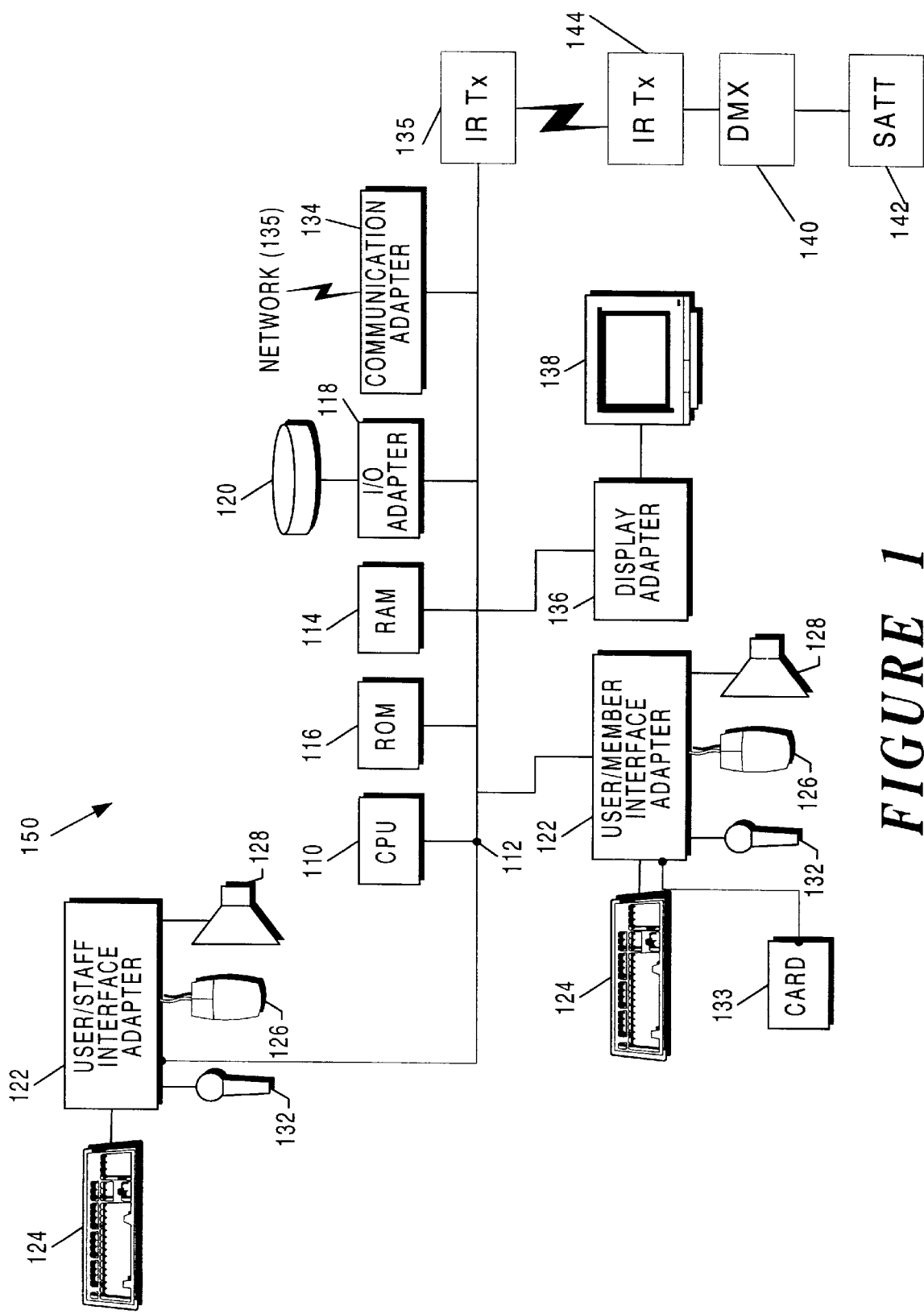
FIG. 1 is a schematic diagram of the present invention.

A preferred embodiment of a system in accordance with the present invention is preferably practiced in the context of a pair of computers. Such computers each may take the form of an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, a card reader 133, an IR remote control device 135, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Card Readers

An identification card used in a conventional card identification system, e.g., a door check-point, is generally made from a plastic card coated with a magnetic strip for registering an identification code thereon. Once the card has been registered with a specific identification code that can not be changed because the code on the magnetic strip is presented and prescribed in progressive order. Therefore, the identification card is very difficult to duplicate. Furthermore, this type of identification card must be kept away from magnetic field and direct sunlight so as to prevent the presented identification code on the magnetic strip thereof from being disturbed or decayed.

The identification card can be made from any of a variety of transparent, translucent or opaque materials and easily duplicated by the user. As an option, a card identification system may be provided in which the symbol on a card can be varied in shape and previously recorded in a memory of a microprocessor thereof so that the card is precisely detected by a card reader head having an infrared scanning device provided therein.

Accordingly, a card identification system may comprise generally a card reader head composed of a light generating unit, an analog/digital (A/D) unit, a transmitter/receiver (T/R) unit, a MF & keyboard decode unit, a LCD unit and a CPU, and a reader device composed of a MF & keyboard decode unit, a LCD unit, a memory unit, a CPU and driving circuit thereof. The improvement is characterized in a card reader head having a light generating unit and an A/D unit laterally disposed therein to form a symbol detecting system. When a card is inserted in a slot of the card reader head, a detecting circuit of the light generating unit immediately sends out a signal to the CPU, via a detecting circuit requesting for an interruption and emits concurrently an infrared ray from the light generating unit. Upon the reception of the signal of an interruption request, the CPU conducts immediately an analog/digital converting process according to an induced voltage from an infrared ray receiver and transmits the code to the reader device, via a serial interface for conducting identification therein. Then, a proper action will take place to drive an output device or give a warning signal in accordance with the available instructions.

A new identification card can be registered in the memory via the card reader head and the reader device. The card can be made from any of varied opaque or translucent materials and marked or perforated with an identification symbol or symbols thereon.

Image analysis devices based upon gray level data techniques usually convert the gray level data to a map of black or white pixels based upon some threshold stored for the device or calculated from the data. The black/white pixel pattern is then analyzed for spatial correlation with stored patterns. This is effective in connection with analysis of printed or written characters that correspond closely to expected forms.

Data is often manually coded on printed forms by users choosing and marking their choices of numerically marked boxes or the like. The boxes may be spaced on the forms or printed to indicate specific numbers or other data choices. The marks may be coarse slashes, lines, x-shapes, dots, rectangles, etc. In the reading of handwritten marks, for example on lottery card entries or standardized tests, it is possible to scan the image of a card or test paper, and to interpret the timing and position of dark marks on the card or sheet as data. This is normally accomplished by moving the card or sheet at a known rate transversely to a linear array of optical sensors. By correlating the timing or linear advance of the card or sheet with the lightness or darkness detected by each individual sensor, data is encoded to reflect spatial positions of pencil marks or the like on the card. This problem has some similarity to reading punched cards, but is complicated because the marks are not as standardized as machine made punch holes in either shape or position.

The designer of a mark reading device is subject to a dilemma. If the reader must be particularly fast or if a card is to encode a substantial quantity of data, it is necessary to position the potential mark choice boxes or the like close together, and to make them rather small. Alternatively, it may be necessary to move the card quickly through the array of sensors. Such efforts to improve processing speed or data density make analysis of the image even more demanding. Furthermore, improvements in the speed and accuracy of detecting data are expensive. These may relate to closer dimensional control of the cards, more powerful light sources to develop better images, more sensitive optical elements and greater precision in card feeding. Each of these changes can be expensive and most demanding in terms of precision, maintenance and the like.

Expensive high performance feeding or reading equipment might be justified in connection with certain applications such as standardized tests, in which a large part of all the marked test forms are to be centrally processed by one or a few processing offices. High performance equipment might also be appropriate for reading currency. On the other hand, it may not be cost justified to provide all point of sale terminals and all terminals for processing lottery card entries and similar hand-marked data cards with such sophistication. These cards and their readers should be dependable but simple and inexpensive. Their readers should be insensitive to variations in the cards and the manner in which marks are placed on the cards, and detection equipment should be accurate and inexpensive. With these objects in mind, it is difficult to justify the analytical sophistication and high precision hardware that might be used for devices that read shaped account numbers from checks, or otherwise perform relatively slow but important and precise analyses.

Inexpensive marked card readers may also be subject to other uses such as fast-service retail establishments where customers make selections by marking cards.

In this case, product attributes (e.g., the appearance of appetizing food, etc.) can be printed on the cards to be marked with selections.

A number of conventional features are used in the art to facilitate character location and character recognition by machine. These devices are based upon expecting distinguishable characters (e.g., having a known size and shape) to appear (or not appear) in the image at a predetermined location relative to other features or relative to the borders of the image. It is known, for example, to use spaced identification marks at the borders of the card for triggering signals. In such a device for example, detection of a timing mark causes loading of the current light/dark status of each photosensor in a row into a register. Timing marks are not used in the art as a means to discern among a plurality of possible lottery card entries, or to form a basis for mapping of an instantaneously-recorded matrix of data in an image field, to correct for variations in position due to x-y displacement and skew. Such displacement and skew are the frequent result of feeding of cards without a great deal of precision, or feeding cards that do not conform precisely to nominal dimensions due to folding or spindling, or imprecise manufacture, which attributes are only to be expected of lottery player entry cards.

The image of a player entry card with locating marks is recorded instantaneously. A stationary image is developed by stopping the card or strobing a light source illuminating a slowly moving card. Problems with misalignment and skew are minimized because the card image data can be analyzed by its locating marks. Therefore, problems that would otherwise be associated with misalignment of a card transversely fed through a linear array of photosensors do not occur. The video or other image is sampled and encoded for its grey levels at spaced pixels in a matrix covering at least the potential mark area of the card and an area of printed identification marks on the card. The identification marks, which are spaced, define a baseline against which the potential mark areas can be mapped.

Grey level pixel data is analyzed using a comparison especially adapted for use with handwritten marks, said marks being variable in shape and in darkness. The unit compares the darkness of pixels at successive pixels in potential mark areas with the immediately adjacent pixels in a pattern of a star. The pixel in the central part of this comparison zone, or the "target" pixel, is weighted by a factor equal to the number of adjacent points with which the target pixel will be compared. For example, the target pixel value is multiplied by 4, and the summed value of 4 adjacent pixels is subtracted therefrom. The resulting difference exceeds a threshold if there is an edge of contrast anywhere in the star-shaped pattern analyzed. This analysis is preferably done on a number of target pixels within the box, bracket or other printed delineation of a mark-receiving area. A sufficient number of such edges is taken to indicate the presence of a mark.

Inasmuch as the invention detects edges of contrast in the field of analysis, the lightness or darkness of the overall card and the lightness or darkness in the general field of analysis are both irrelevant. Detectable edges are therefore found even in marks on smudged areas characteristic of pencil erasures.

In the context of the present invention, controlled access may be afforded in any desired manner. The invention relates generally to the field of access control system for assuring that only authorized personnel are permitted to enter or leave restricted areas and particularly to systems including expensive egress control, group blocking, erasure but not destruction of cards after a predetermined number of unsuccessful entry attempts and also a system which includes area access authorization information which is coded in machine readable form on the individual's personnel identification card.

Access control systems have been proposed heretofore which utilize personnel identification cards to control movement of personnel through doorways. One typical system has utilized personnel identification cards in connection with a verification check to determine whether the person possessing the card is a person who has been authorized to use the card. The verification check typically requires the person possessing the personnel identification card to insert the card into a card reader which then reads the machine readable data encoded thereon and stores this data at a central control location. The person seeking entry is also required to enter a secret identification number on a keyboard located near the card reader. This secret identification number is then utilized by a verification circuit to determine whether the person possessing the card also knows the proper secret identification number which corresponds to that card. If the secret number is correct, the system assumes that the person possessing the card is authorized to enter.

In other prior art systems, checks other than verification checks have been proposed. One such check has been to determine whether a person's authorization to enter a restricted area has been withdrawn. Typically such proposals include a computer-like central processing unit which compares the personnel identification number read from the card against a list of identification numbers with respect to which authorization has been withdrawn. Should a comparison be found between the number read from the card and one of the numbers on the list of unauthorized personnel, the apparatus responds to prevent opening the door to the restricted area despite the fact that other checks performed by the access control system such as proper verification, were satisfactory.

Some of the proposed prior art access control systems have extended their surveillance to include egress monitoring as well as entry monitoring. Such prior art proposals typically include a card reader and, in some cases, a keyboard located at each entrance to, as well as at each exit from, restricted areas. In some such systems, in order to leave a restricted area, the individual must insert his personnel identification card into the card reader and also enter his secret identification number in the same identical manner as required to enter the restricted area. In other systems, the person seeking to leave the restricted area need only enter his personnel identification card into the card reader. In both such approaches, however, the system requires that a card reader be located on both sides of the doorway to the restricted area. As such, the cost of each door installation is greatly increased because at least two card readers are necessary at each doorway. Furthermore, for the systems having a keyboard on both sides of the restricted area doorway, the cost is even higher because two keyboards as well as two card readers are required at each doorway.

A further typical capability of proposed prior art access control systems has been to permit personnel access to different restricted areas according to individualized access authorization information maintained at the central location which is addressed with the individual's identification number read from the card. Consequently, when a person seeks entry to a restricted area, his personnel identification number must be read from his identification card and the access authorization information for this individual retrieved from the central storage. After the access authorization information is retrieved, it must then be checked to determine whether the individual is seeking to enter a restricted area to which access has been authorized. Consequently, access authorization checks in such prior art systems require relatively complicated computer technology and large scale storage capability. In fact a computer itself is necessary to perform the access authorization checking functions. Consequently, such systems have proved to be complicated in design and very expensive to install.

An access control system may be provided which includes, at each lockable door to a restricted area, a door control unit having a door lock, as well as a single keyboard and a single card reader both of which are located outside of the restricted area. Each keyboard, card reader and door lock is connected via a communication link to a central control which is operative to control much of the operation of all elements of the door control unit. When an employee wishes to enter a restricted area, he inserts his personnel identification card into the card reader and also enters a secret identification number on a keyboard. The central control responds to the keyboard data and the card data to determine whether the door lock should be released. In so doing the central control performs a verification check to determine whether the person possessing the card is authorized to use the card. In addition, the central control determines whether the card in the reader corresponds to a card issued for the particular system or plant. Additionally, the central control checks the access data on the card to determine whether the individual has been authorized to enter the specific restricted area or gate through which entry is sought. Assuming that all of the different status checks are passed satisfactorily, the door lock is released and the individual permitted to enter the restricted area, whereupon a printer is actuated to record the identification number, time, door and the fact that an entry has occurred.

The system may include a floormat sensor inside the door which detects personnel approaching the door from inside of the restricted area. The sensor activates a buzzer or other humanly perceptible signal means located outside the restricted area to remind the person after leaving the restricted area to insert his personnel identification card into the card reader located outside the restricted area. When the restricted area door has closed and the card inserted into the reader, the buzzer stops and the central control reads the card data and actuates the printer to record the identification number, time door and the fact that the person so identified has left the restricted area.

The system includes two blocking features, that is, the system can selectively block personnel from entering restricted areas. One blocking feature permits selective identification of individuals who possess a proper personnel identification card but who are no longer authorized to enter the restricted area. The second feature permits selective identification of groups of individuals possessing proper personnel identification cards who all are not currently authorized to enter the restricted area. The selective identification of blocked individuals is achieved by a decoding circuit and a matrix board arrangement. Diode pins are inserted in locations on the matrix board which correspond to blocked individuals. If a block signal passes through the decoder and also through the matrix board, the signal indicates the individual is not authorized to enter the restricted area. The group blocking is accomplished simply by decoding some but not all of the personnel identification number digits. Combinations of these digits can be selected by a switch arrangement so that a block signal will be generated for all individuals having the selected personnel identification number digits in common.

In all instances, the access control system provides a printed record for each detected system event. This record is generated by a recorder which, in the preferred embodiment, is a printer provided to produce the record of the type of event which has occurred, the personnel identification number from the card read by the card reader at the time the event occurred, the door at which the event occurred, the date, and time.

Music Providers

Radio networks offer the most significant marketing medium for the music industry to create awareness for music titles and artists. But music products such as records, cassettes and compact disks (CDs) are inconvenient to purchase at the time when the consumer has the maximum impulse to buy, after hearing a musical piece on the radio.

Additionally, the inability to automate many of the key functions of a radio based, direct marketing sales operation make it cost prohibitive for a single radio station to establish a direct marketing service linked to the music they broadcast. Station operators offer different programming in each market area making it unsuitable to link their stations into a national music retail network. As well, regulatory limitations curtail the number of stations a radio operator can own in a major market thereby limiting the number of listeners below the critical mass necessary to operate a profitable direct marketing music business.

Radio broadcasters provide no means to fulfil the impulse purchase nature of the radio business. When a radio listener hears a music piece they wish to purchase they must listen for, and remember, the artists name and title of the song. In many instances it is inconvenient to write this information down for future reference. In order to purchase the music product containing the song heard on the radio the consumer must be further motivated to travel to a music store to proceed with the purchase process. At the music store the potential purchaser must determine if the selected music product is in stock and assess the pricing information.

The consumer is further constrained because they are unable to preview the songs on the music product they are considering because the music products are packaged and cannot be played at the store. The potential purchaser must remember and continue to be motivated by the music piece heard on the radio broadcast, possibly from days ago, and hope the other pieces recorded on the album are of sufficient interest to justify the purchase. The inconvenience and inability to sustain the impulse impetus severely impacts the purchase process.

Radio networks are unable to capitalize on the direct marketing opportunities they initiate through impulse music purchases because of the high cost of creating a direct marketing operation. Coordinating and tracking the music aired with the music products to be sold, recording of musical excerpts to be previewed, customer service operations and order fulfillment are all high overhead activities requiring a large dedicated staff with a separate skill set than radio station personnel. The cost for a radio station to establish a direct marketing operation far exceeds the returns from the music selling proceeds derived from a single radio station.

Cable television shopping networks have successfully developed large direct marketing networks based on national coverage by telecasting their programming over many cable companies reaching millions of potential purchasers. Radio station operators are unable to market music products in the same manner because station operators broadcast different music programming in each market preventing the linking of these stations into a common national market.

Radio is the most widely received broadcast medium throughout the world. The problems as previously described have prevented radio networks from being utilized for a mass media, direct marketing, music retail business. Other problems associated with radio networks is overcome using satellite technology. There are requirements in large countries throughout the world to provide high audio quality, multiple program radio broadcasts. Historically radio broadcasting started with terrestrial stations using low transmission frequencies with AM (Amplitude Modulation). Due to its analog narrowband characteristics, susceptibility to interference and propagation variability, AM terrestrial stations cannot transmit high audio quality broadcasts nor, beyond a local area, provide reliable wide geographical coverage. Subsequently, terrestrial radio stations using higher transmission frequencies with FM (Frequency Modulation) were implemented. These transmit much better quality audio programs, but each terrestrial FM station provides only local geographical coverage (e.g., a 40 km radius is typical) and the signal is analog. Currently several systems which could provide high quality (e.g., compact disc) terrestrial radio broadcast on a local geographical basis using digital modulation are under technical evaluation (Broadcast Engineering Conference Proceedings; National Association of Broadcasters; April., 1996; pp. 5–26 and 115–125).

The requirement to provide high quality, multi-program radio broadcasting on a broad geographical basis (e.g., nationwide, regional or hemispherical) through use of satellites to transmit the radio programs directly to fixed, mobile and transportable receivers on the earth has been proposed (International Journal of Satellite Communications; Vol. 13, Nr. 4; July–August 1995; pp. 215–272). With the current state of art and projected advancements in satellite technology, such radio broadcasts from satellites must be within direct line of sight of the user receivers, although multiple satellites can be used to mitigate blockage and certain partial blockage, such as tree foliage and multipath. Multipath can also be mitigated by using higher satellite transmission power. However, current and projected satellites do not have the power transmission capability to penetrate modern buildings or to provide service where heavy satellite signal shadowing exists, such as in the central cores of large cities, with reliable reception of high quality multi-program audio programs. It has been estimated that such blocked or heavily shadowed transmissions would have to be at least a thousand times more powerful than a non-blocked satellite transmission (Direct Broadcast Satellite Radio; Nasser Golshan; California Institute of Technology (JPL D-9550); March 1992; pp. 13–18) and, even if this could be eventually accomplished, the cost of the extremely high powered satellites and their launch vehicles would make the service uneconomical.

A solution for providing high quality, multi-program satellite radio broadcast service available to listeners in fixed locations, such as homes and office buildings, and in automobiles moving through heavily shadowed areas is to broadcast the radio service in these particular areas of the country by associated terrestrial broadcast radio stations. This can be accomplished by having such terrestrial broadcast stations receive the satellite transmission and rebroadcast it in a different radio frequency band. Generally there are no suitable additional frequency bands available to accomplish the rebroadcast, and all mobile radio receivers would be more expensive due to the need to receive two frequency bands. It is therefore important to devise methods where the satellites and associated terrestrial broadcast stations use the same transmission frequency without interfering with each other.

A method to use the same radio frequencies for a combined satellite broadcast and terrestrial rebroadcast system has been proposed by French and Canadian organizations (Digital Audio Broadcasting Proceedings; European Broadcasting Union; June, 1992; pp. 99–109) and experimental results reported (Digital Audio Broadcasting Proceedings; Canadian Association of Broadcasters; March, 1994; pp. 206–235). The method uses a modulation called COFDM (Coded Orthogonal Frequency Division Multiplex), and it has been shown theoretically and by measurement (Digital Audio Broadcasting Proceedings; Canadian Association of Broadcasters; March, 1994; p. 179) that coverage gaps occur within the service area when the satellite and terrestrial signals have similar amplitudes but arrive at user receivers with a time differential greater than the system's allowable guard band interval.

The present invention incorporate the use of spread spectrum modulation configured to allow satellite radio broadcasting and associated terrestrial radio rebroadcasting of high quality, multi-program audio programs at the same radio frequency so that user reception is possible at all locations ubiquitously over very large geographical service areas.

Television programming has increased over the years from programming that provided only a few networks to programming that provides a variety of networks and other types of services. Television providers such as satellite providers, cable providers, LMDS and MMDS providers etc. (hereinafter in the specification and claims "program providers") deliver television programs, audio programs, telephony etc. to home users through a decoder/receiver ("set top box"). The number of programs delivered by a program provider can well exceed a hundred. Some of these programs are typical movie and sports programs while others could include audio programs such as classic rock, jazz, country music etc., or data programs such as stock quotes or weather. It is now customary for many program providers to supply paper programming guides to assist the customer in wading through the variety of services offered by the program provider and the "channel" number for each particular type of program. Instead of, or in addition to, the paper programming guides many program providers deliver to the home user an on-screen program guide. Some of these on-screen program guides continuously scroll through all of the programs available for the next hour or so and the channel that a user can select to receive a particular program. If there are, for example, 150 "channels" or programs and a user is looking for a channel which provides classic rock, he/she may have to wait to view all program names on the program guide for all 150 channels before finding the classic rock channel.

Some on-screen program guides enable a user to view the program guide only for those channels showing a particular type of programming, e.g., the channel number and programming for all of the audio channels. An on-screen programming guide may also have an added feature of enabling a user to scan up and down the program guide by using the channel up/down keys rather than having to wait for the program guide itself to scroll through all of the programs. Although this limits the number of programs in the program guide that a user must sort through before finding his/her favorite program, it is still a cumbersome technique for a user to find his/her favorite program. For example, if a user has a favorite program such as the classic rock audio program the user must either remember the three-digit "channel" number for the classic rock program, use the program guide each time to refresh the user's memory or actually use the channel selector on the set top box to scan through the available programming to find the classic rock audio program. Since most people have several favorite audio programs, several favorite sports programs, several favorite movie programs and a favorite home improvement program, it is difficult to remember the three-digit channel number for each favorite program and it is also time consuming to use the program guides to find the three-digit channel number and then enter the three-digit channel number on the remote control to finally find the favorite program. For home satellite systems, which provide an abundance of different programming, the process of wading through the extensive program guides is very time consuming.

The generation, replication and transmission of information by automated technology has far surpassed a person's ability to keep up with the information. Not only is this true in the business world, but our leisure activities also involve sorting through an overwhelming number of choices and making intelligent selections. For example, there is an abundance of entertainment in digital-audio or digital-video form, such as compact discs ("CD's"), mini-discs, digital audio tape ("DAT"), laser discs, computer graphics, high-definition television ("HDTV"), etc. The accelerating ability of communication systems to convey this information virtually instantaneously means that we have access to many thousands of selections.

The trend is for computers to be integrated with household devices, such as telephones or televisions, giving rise to "smart phones" or "intelligent" or "interactive" televisions. A telephone with computer capability could be used to "download" digital information, representing, for example, music selections, into the memory of the telephone for later playback. Alternatively, the downloaded information could be written to a medium such as a writeable compact disc. Thus, the smart phone would be capable of downloading high-fidelity music onto a CD that could be played at the user's leisure on his or her sophisticated stereo system.

Since the telephone is connected to a vast network, such a system would provide an efficient method of exchange of sound information. In effect, a user could, for example, "dial-up" a central processor and employ a push-button phone or other input device to request music by the user's favorite recording artist and have it downloaded into the user's home. A similar setup is possible for visual images downloaded to an interactive television via, e.g., a cable network that connects the interactive television to a central site where movies are stored and available for downloading.

However, one problem with these systems is that it is often difficult for a user to keep abreast of all of the possible selections for sound and image data, that is, current releases by a favorite recording artist or current movies that might be of interest to the user. The speed with which new entertainment selections are provided, not to mention the past decades of audio and visual works already in existence, results in a huge number of selections that is ever-growing.

One way for a user, or subject, to make a selection from a large collection of digital "objects" is to allow the user to input selection information into a network. The selection information is then sent to the central or host processor which categorizes the types of objects, e.g., music or video selections, that are of interest to the user and presents the user with these categories of selections. However, the categories are usually broad.

For example, in the music realm a user might make selections in the categories of "country music" or "jazz." These categories are extremely broad, each encompassing many thousands of recordings. On the other hand a user might indicate a specific artist, although this is extremely limiting in that only recordings by that specific artist can logically be associated with the user's selection. Also, this method of having the user provide category selections places the burden of keeping track of new developments on the user himself. The categories may change, for example, rock music has split into various other categories such as heavy-metal, modern, and alternative. Category selection is also limiting to the user since it can only provide what the user knows how to ask for.

Introduction

Much time is spent in shared environments—spaces in which two or more people are in close proximity and are mutually affected by tactile, olfactory, visual, and aural factors such as temperature, scents, lighting, and background noise. These factors are increasingly under the control of computers embedded in our environments. Combined with a growing variety of sensors that can detect people and their activities, these new capabilities allow for the design of intelligent environments. This new paradigm results in a shift of perspective: from viewing people as users of computers to a view of people as inhabitants of environments. One way that an intelligent environment can respond to its inhabitants is by adjusting itself to better suit the inhabitants' needs or preferences.

Traditionally, environmental factors, or elements, in the common areas of a workplace are affected in one of the following manners:

They may be held fairly constant, e.g., the décor in a hallway or entrance area.

They may be varied based on a clock, e.g., lowering the temperature late at night.

They may be controlled by a single person, e.g., turning on the lights in a conference room.

In each case, some thought is typically given to the expected preferences of the people affected by the environmental factors, and one can imagine instances in which explicit preferences might be sought. However, the growing proliferation of embedded computers provides an opportunity to explore the prospect of a more systematic way of taking explicit preferences into account.

One embodiment of the present invention includes a system that adjusts the selection of music playing in a fitness center to best accommodate the musical preferences of the people working out at any given time. The system has a database of fitness center members' preferences for a wide range of musical genres, a mechanism for identifying who is working out at any given time, and an algorithm for selecting a musical genre that will promote members' listening pleasure.

This research grew out of the juncture of two concurrent threads. One is a perception that most of the research in ubiquitous computing has focused on ways that an environment might respond to a single individual rather than a group of people. The other is a frustration with the "lowest common denominator" music typically played in a fitness center on a daily basis.

The group preference agent embodied in the present invention is not limited to selecting music in a fitness center, however. It is applicable to any shared environment in which people gather for an extended period of time. For example, a restaurant provides another type of environment that might benefit from a group preference agent, however an elevator would not be a good candidate. Furthermore, the approach is applicable to environmental factors beyond music or other auditory input: visual, olfactory and tactile factors could also be adapted to the set of people assembled in a particular location. Finally, the set of preferences for each individual might either be explicitly specified by each person, or inferred based on knowledge of the person's behavior, e.g., a shopper's purchase history.

In the sections that follow, the fitness center environment will be described in which the present invention operates, an overview will be provided of how the system works, results of a poll that was conducted to assess the popularity of the present invention among fitness center members will be provided, a quantitative evaluation of the performance of the system that is based on comprehensive logs of all events of interest will be described, and some interesting interactions that have been observed between members and the present invention will be provided.

An Embodiment of the Present Invention

Overview

The music played in a fitness center provides for an ideal laboratory in which to experiment with a group preference agent. People are gathered together in a common location, each performing separate (though related) activities that do not typically require much attention. Since the foreground activities are not engrossing, background environmental factors become more important. Most people want to hear some music while they are working out; the problem for the staff of a fitness center is to decide which music to play.

The fitness center at the Andersen Consulting Technology Park (ACTP), called the Fitness Xchange (FX) group environment, is located in the lower level of our 20 Northbrook facility, and is open to all ACTP residents from 6:00 a.m. through 8:00 p.m. each weekday. The group environment has 24 cardiovascular machines (treadmills, stationary bikes, stair climbing machines, and so on), 14 strength-training machines and an assortment of free weight equipment. The number of people working out ranges from a high of around 25 at peak times (before work, lunchtime, and after work) to one or two people during mid-morning and mid-afternoon hours.

ACTP subscribes to the PrimeStar™ direct broadcast satellite service, which includes the Digital Music eXpress (DMX©)) music service, providing 91 stations of commercial-free music, each representing a different musical genre. The variety of genres includes Album Rock, Classic Jazz and Symphonic, as well as Flamenco Music, German Oldies and Beach Party. Prior to the installation of the present invention, the group environment staff manually selected DMX stations; this manual selection process is complicated by the fact that the room containing the satellite receiver is located in another part of the building, resulting in relatively infrequent station changes.

The FX group environment is the most popular service at ACTP, with over 600 members among the Park's 1500 residents. However, despite the general popularity of the present invention, the music played in the group environment is a source of controversy, accounting for 50% of the verbal complaints made by members to the group environment staff and 25% of the written "suggestions" submitted anonymously by members. There are a small number of members who are quite willing to express their preferences for (or, more often, against) different types of music, and in the absence of input from the less vocal members, there tended to be a "squeaky wheel syndrome" where the complainants got their way. This factor, combined with the inconvenience of physically changing stations, resulted in only three stations—the ones that generated the fewest complaints—being played, out of the set of 91 possible stations.

The primary research goal of the present invention is to explore the social ramifications of a group preference agent in a shared environment, i.e., whether a system that controls an environmental factor based on people's preferences can prove socially acceptable. Related to this research goal, the more pragmatic goals for the present invention system are to:

Democratize the music selection process. Accommodate the silent majority rather than the vocal minority, resulting in greater listening enjoyment for group environment members. The more vocal members may not be pleased as often, but the less vocal members will now have their voices "heard".

Increase the variety of music played. Provide airtime for the stations outside of the lowest common denominator set. Members who work out at off-peak hours may now be able to listen to music that would never be played when larger numbers are present.

Offload the music selection task from the group environment staff responsibilities. Enable the staff to spend more time attending to fitness related matters rather than acting as disc jockeys.

While these goals focus on the issue of music selection in the context of a fitness center, they have broader applicability. The idea of democratizing the control of a common environmental factor could be applied to lighting or temperature levels. While people probably would not enjoy rapidly fluctuating lighting and temperature levels, increased variety in the décor of common areas might be a welcomed change. Finally, any person who shoulders the burden of controlling a highly controversial environmental factor could benefit from a system that arbitrates among diverse preferences.

Having described the environment in which the present invention operates, it is time to turn to a description of the system itself.

Detailed Description

The present invention runs on two Windows 95 computers that are linked via an ACTP local area network. One computer, called the DMX computer 140, is located in the room that houses the DMX satellite receiver 142. It has an infrared (IR) remote receiver 144 attached to its serial port. The other computer, the group environment computer 150, is located in the group environment: all the software modules described below reside on this computer. When the system selects a new station, it sends a command from the group environment computer 150 to the DMX computer 140, which translates it into a channel change signal sent to the IR remote receiver 144.

The present invention provides two interfaces 122 accessible on the group environment computer 150. The group environment member interface allows members to login to the system, to update their preferences for any station, and to provide anonymous feedback about the system. The group environment staff interface allows the staff to monitor the system, manually select new stations and to adjust certain parameters that will be described below.

Underlying these interfaces, the group environment computer 150 hosts three components that enable the operation of the system: a database of group environment members' musical preferences, a mechanism for identifying who is working out in the group environment at any given time, and an algorithm for selecting one among the 91 genres of music that will promote members' listening pleasure. This algorithm is invoked each time an event occurs, e.g., a member enters the group environment to begin a workout. Each of these components is described in greater detail below.

Preference Database

In order for a group preference agent to make an informed decision about how to affect environmental factors, it must know something about what the current inhabitants prefer. In the present invention, each group environment member specifies his or her preference for each musical genre. The preference rating for a genre is represented by a number ranging from +2 to −2; FIG. 2 provides an interpretation for each of these levels of preference.

A member submits an electronic enrollment form upon first joining the fitness center; the group environment member interface also contains an update screen that permits a member to enter or update his or her musical preferences in the fitness center at any time.

Presence Detection

A group preference agent must know the composition of the group—who are the current inhabitants?—in order to make decisions about how to adjust environmental factors. Members login to the present invention by swiping their ACTP badges across a proximity badge reader. In case a member loses his or her badge, the system also permits members to login manually, using the same login ID they use for logging their fitness activities at a separate computer maintained by the group environment staff.

Group Preference Arbitration Algorithm

The group preference arbitration algorithm takes as input an M×N table of integer-valued preferences ranging from −2 to +2, where M is the number of categories being rated (musical genres) and N is the number of inhabitants (group environment members who are currently working out). For each category i, and each member j, that member's individual preference for that category ($IP_{i,j}$) is used by the algorithm to compute the overall group preference for that category $$GP_i = \sum_{j=1}^{N} (IP_{i,j} + 2)^2$$

($GP_i$) using the following summation formula:

The formula first converts all individual preference ratings to non-negative numbers, so that a weighted random selection operator (described below) can be later applied. These values are then squared in order to widen the gap in selection probabilities between the more popular categories and the less popular categories.

Once this group preference value is computed for each category, the list of values is sorted in descending order, such that the most popular category is first and the least popular is last. The policy of always selecting the top category is considered, but since most people typically workout at the same time each day, they would tend to hear the same music under this scheme (unless they update their individual preferences). The second most popular station might be the favorite among a few of those people, but it may never be played. Therefore, the system uses a weighted random selection policy for selecting one of the top m stations (called the candidate set), where m is a parameter whose value is set by the group environment staff.

FIG. 3 depicts a set of sample preferences for five people (A through E) and ten musical genres. The group preference value calculated for each genre ($GP_i$) is shown in the second column from the right. Assuming that m=3, i.e., the candidate set is limited to the three most popular genres, the probability of selecting each genre ($Pr_i$) is shown in the rightmost column. The sum of the GP values for the three most popular genres is 141, so the probability of selecting the most popular genre, Alternative Rock, is 0.48, nearly twice the probability of selecting the third most popular genre, New Music.

Note that if these five people were to work out at the same time each day, simply choosing the most popular station would mean that person C would always listen to music that he or she does not particularly like (nor dislike). Using the weighted random selection algorithm would allow this person to listen to music that he or she likes (New Music) or loves (Hottest Hits) some of the time.

Events

There are five events that trigger the execution of the group preference arbitration algorithm:

Member Entrance

Member Exit

Individual Preference Update

System Parameter Adjustment

Maximum Station Play Time Elapsed

Each time one of these events occurs, the algorithm is run, and if the currently playing station is not in the candidate set, a new station is selected.

Member Entrance

As mentioned earlier, members either swipe their ACTP badges or manually login at the computer. When a new member enters the group environment, his or her preferences must be added to the pool of preferences used in the group preference calculation, so this login process triggers the Member Entrance event.

Member Exit

It was decided not to require explicit logouts to trigger Member Exit events, for fear that people might forget to logout at the end of their workout sessions; another consideration was that the music plays both in the fitness center and the adjacent locker rooms, and it is preferred that members' preferences still be considered while they are in the locker rooms. A survey revealed that the average duration of a workout, including locker room time, is 70 minutes, with a standard deviation of 20. It was decided that it was better to continue to include some members' preferences after they finish working out than to exclude some members' preferences while they are still working out; therefore, a default time of 90 minutes was set for the duration of a workout session. After this time, a Member Exit event is triggered, and that member's preferences are removed from the pool of preferences considered in the group preference calculation.

Individual Preference Update

Whenever a member updates his or her preferences, the pool of preferences (the set of individual preferences associated with the group of people currently working out) considered during the previous invocation of the algorithm is no longer valid. Such an update often occurs when a member decides he or she dislikes or even hates the currently playing station, even though he or she had previously specified a more positive rating for that station. After the individual preference update, the group preference value for the currently playing station would then decrease, possibly so far as to cause the current station to fall outside the candidate set. Since it is undesirable that the current station continue playing in this case, an Individual Preference Update event is triggered to force the algorithm to run again.

System Parameter Adjustment

When the group environment staff changes a system parameter, e.g., narrowing the range of top-rated stations to be considered, the currently playing station may or may not remain in the candidate set, so a Parameter Adjustment event is triggered.

Maximum Station Pay Time Elapsed

Due to the diverse, and sometimes conflicting, musical tastes of the group environment members working out at any given time, an inability to please all the people all the time is recognized. One situation that is avoided is "starvation"—one or more members never hearing music they enjoy due to the differences between their music preferences and those of the majority of people with whom they regularly workout. The weighted random selection operator is one strategy used to reduce the likelihood of starvation. Another strategy used is to limit the period of time that any one genre will play—regardless of how popular it is—before the selection algorithm is invoked in order to select a new station. A Maximum Station Play Time Elapsed event is triggered when the specified period of time elapses.

System Parameters

The group environment staff can constrain the operation of the present invention by adjusting any of the following three parameters:

Individual Preference Filter
Group Preference Filter
Maximum Station Play Time

Each of these is discussed in more detail below.

In addition to a set of controls for the parameters listed above, the interface for group environment staff also provides the capability to manually select new stations to play at the press of a button (rather than having to walk down the hallway to another room). The group environment staff interface also includes a button to turn off the algorithm, requiring manual intervention by the group environment staff for all subsequent station changes.

Individual Preference Filter

A primary motivation behind the present invention is to increase the listening pleasure of the group environment members working out at any given time. This can be accomplished by playing more of the music that members want to hear or by playing less of the music that members do not want to hear (ideally, both). One way to ensure that the system plays less music that people do not want to hear is to prohibit the system from playing any station for which anyone present has specified a low rating. The system provides the group environment staff a way to specify an individual preference filter threshold between 2 and −2; any station for which a present member has specified a preference value below the threshold is eliminated from consideration by the algorithm. For example, a threshold setting of −1 prohibits any station for which anyone currently working out had specified a rating of −2 (i.e., at least one member hates this kind of music).

Group Preference Filter

The group preference filter parameter (the variable m in the group preference formula listed above) allows the group environment staff to specify how many of the top-rated stations are considered candidates for the weighted random selection procedure. The possible values range from 1 to 91, where 1 forces the system to select the top choice each time and 91 permits the system to select any station (though selection of popular stations would be more probable than selection of less popular stations). This parameter was included to give the staff some control over the variability of the music being played. Most group environment members follow fairly regular workout schedules, e.g., Monday, Wednesday and Friday from 7:00 to 8:00 in the morning; thus, many of the same people work out at the same time each day. If the system always chose the top-rated station, then members would be likely to hear the same station every time they work out. While this policy is still permitted with a group preference filter setting of 1, the music selection is allowed to vary among the set of most popular stations.

A group of stations with the same group preference value forms an equivalence class. The group preference filter threshold may arbitrarily partition such an equivalence class: some members of equivalence class will be included in the candidate set, while the rest are excluded. If there were a fixed ordering within an equivalence class, the stations that occur earlier in the ordering would tend to be played more often than those that occur later in the ordering. Therefore the sorting routine ensures that stations within an equivalence class are randomly distributed within each segment of the sorted list. This is especially important since, as noted before, the regularity of member workout times combined with a constant group preference filter would result in the same stations being prohibited each day.

Maximum Play Time

The period of time that any one genre can play without interruption is limited by the maximum play time parameter, which varies between 1 and 60 minutes. An initial setting of 30 has been used. Coupled with the estimate of workout sessions lasting 90 minutes, on average, this results in at least three genre changes—for a total of at least four genres that will be played for any one member's workout.

Poll Results

Six weeks after the present invention was installed, a survey was conducted to find out how well the members liked the music being played in the fitness center. Members were asked whether they thought the music being played was better, worse or the same, compared to before the system was installed. Members also were asked to share the things they liked most, and the things they liked least, about the system.

Figure 4:
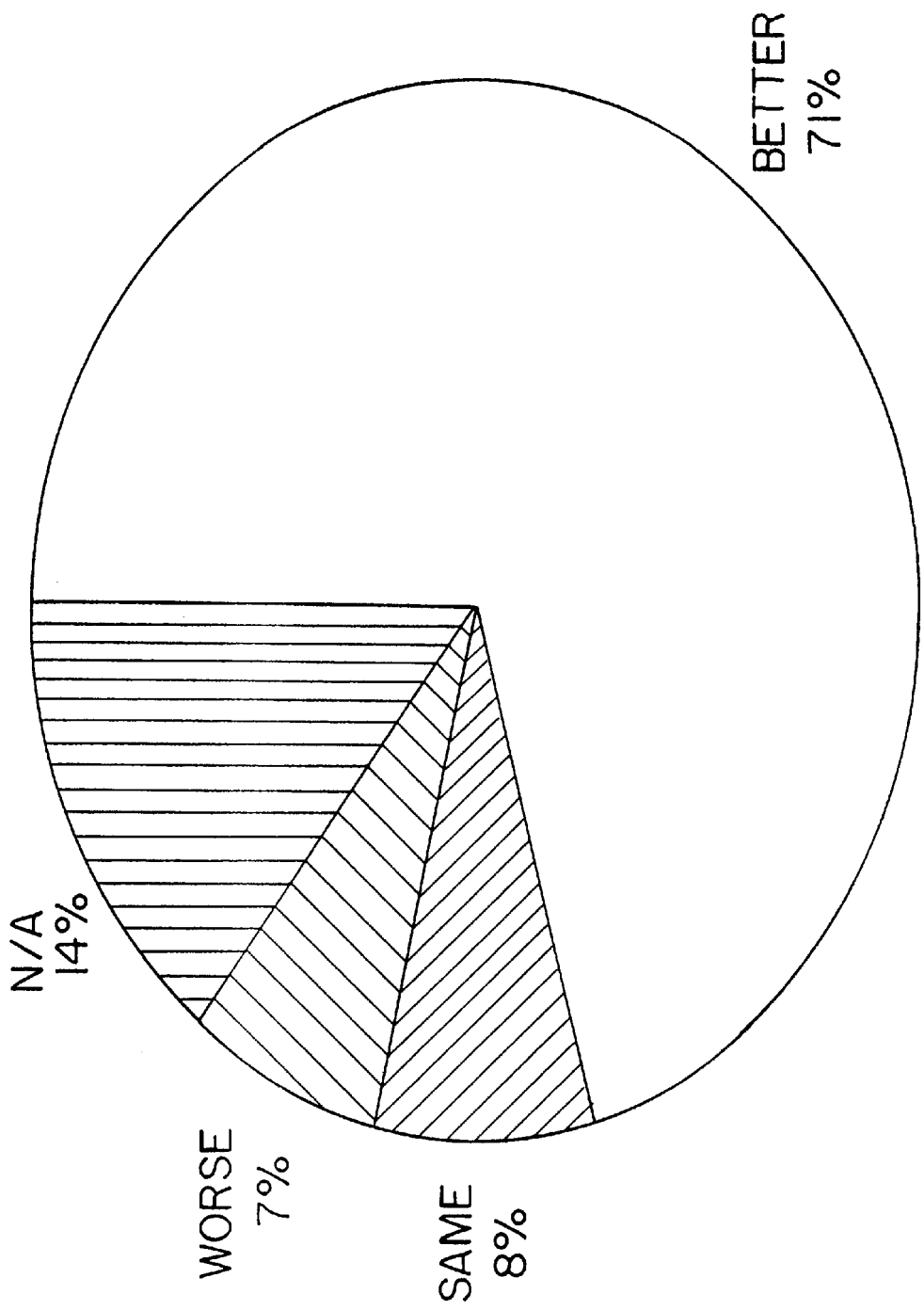
FIG. 4 is a graph delineating a summary of responses of the various members of the group environment after use of the present invention.

A total of 71 responses were received, which represents more than 25% of the members considered active at the time the poll was conducted. The responses are summarized in FIG. 4.

The vast majority of the respondents (71%) said they like the music selected by the present invention better than the music that had been played prior to the installation of the system, and only a small fraction of the people (7%) thought the music is worse. A few people (8%) thought the music was about the same, and there was a final group of people (14%) who had joined the fitness center after the present invention was installed, and thus were unable to answer that question. Nearly half of the respondents said that they enjoyed the increased variety of music played by the present invention. A third of those responding said that they liked having some influence in the selection of music. One fourth said that they liked the "good music" played by the system. Other popular aspects of the system include exposure to new music, being subjected to "bad music" less often, and the elimination of disputes over the music since the system was installed. The present invention currently has no mechanism for detecting song boundaries, so it often changes stations abruptly in the middle of songs; this shortcoming was cited by a third of the respondents as one of the least popular features. The "occasional" selection of "bad music" was a complaint among fifteen percent of the survey participants, a side effect of the greater variety of music played. Eight percent of the respondents said that the present invention did not exhibit enough variety in its selection. Three people said the stations changed too often, while one said they didn't change often enough, and three people complained about the offensive lyrics heard on the Rap station.

Qualitative Evaluation

The apparent popularity of the present invention is encouraging, based on the results of the poll. However, it was also desirable to take advantage of the extensive logs being kept by the system, and undertake an in-depth evaluation of how well the music played by the system corresponds to members' stated preferences.

In this section, the data used in the evaluation is described, the metrics developed to measure the performance of the system, and the results of this evaluation.

Evaluation Data

The present invention maintains three log files:

An event log that is updated for each of the five system events listed above (member entrance, member exit, individual preference update, system parameter adjustment, and maximum station play time elapsed).

A preference log that is updated each time a member makes changes to his or her ratings for any of the 91 stations.

A feedback log that is updated each time a member submits anonymous feedback through the member interface.

The data used for the evaluation was drawn from the first two log files, which are described in more detail below. The feedback log is a text file into which comments typed in by members on a special pop-up window are anonymously written. It has only been used a few times, and the comments are similar to those mentioned above in the section on poll results.

Event Log

Every event that has some potential effect on the system is tracked in the event log. Over 5000 events were logged during the initial six-week period. Each entry in the event log includes several fields:

Date and time.

Type of event, e.g., member entrance.

Member IDs of the people present, in the order of their arrival.

System parameter values: settings for the individual preference filter, group preference filter and maximum play time.

Station currently playing.

The status of each station, including the station ID, the group preference value ($GP_i$) for that station, and a prohibited flag that indicates whether the station is currently a member of the candidate set or prohibited (based on the individual preference filter or group preference filter).

Reason for station change (if applicable), e.g., to distinguish between station changes due to a timeout (based on the maximum play time parameter) from those due to the currently playing station falling out of the candidate set (based on a change in group preference values due to the entrance or exit of a member).

Preference Log

Each preference log entry includes the date and time of the entry, the member ID and name of the person updating his or her preferences, the new set of ratings for each station, and a flag indicating whether this is a new member enrolling in the system with an initial set of preferences or an existing member updating an established set of preferences.

Evaluation Metrics

The data collected in the log files of the present invention provides the opportunity to evaluate a broad range of issues concerning the behavior of the system—especially with respect to its selection of stations—and its effect on people.

Statistics Gathered about People

The primary goal in evaluating the data contained in the logs is to quantitatively assess the satisfaction of members, by comparing their preferences to the stations to which they were listening while in the fitness center. However, there is also interest in the distribution of ratings for different musical genres, and how that distribution changed over time.

Figure 5:
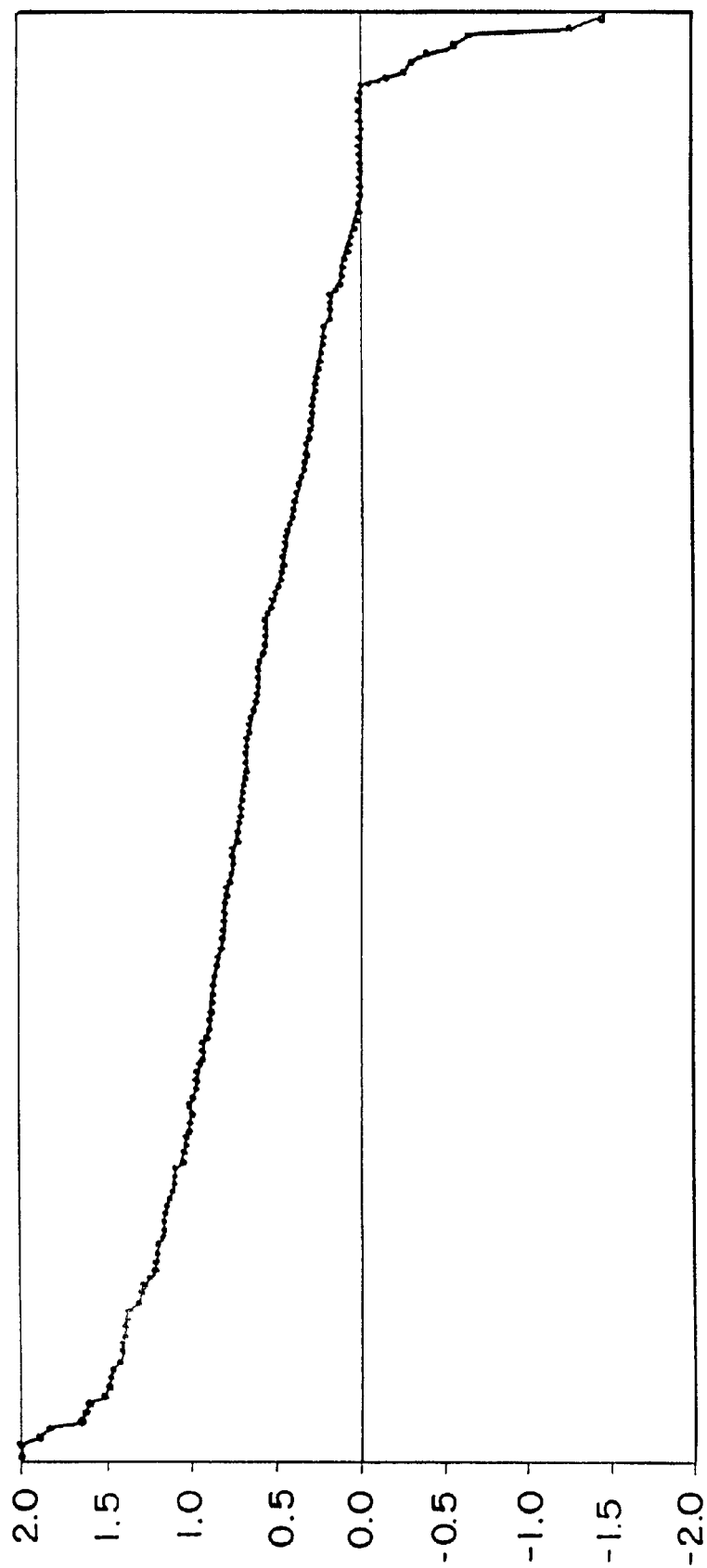
FIG. 5 is a graph of the average satisfaction for the members who logged into the system during a six-week test.

To compute the satisfaction of members over the first six weeks, information was extracted from both the event and preference logs. For each member entrance event, the stations that were selected for that member during that 90-minute session were tracked, and how long those stations played during the session. The member's rating (−2 to +2) was then determined for each station at that time, and multiplied by the member's rating by the length of time the member listened to that station. Dividing this number by the duration of that session gives the session satisfaction for that member on a scale of −2 to +2. The average satisfaction for that member over the entire six-week period can be found by simply taking the average of all session satisfaction values. The average satisfaction for the 170 members who logged into the system during the six-week period is shown in FIG. 5.

All but eight members have non-negative satisfaction values, and the vast majority of members have positive satisfaction values. Of the eight members who appear dissatisfied, i.e., have negative satisfaction levels, five had logged in fewer than five times, and can reasonably be expected to achieve higher levels of satisfaction over time. The other three members each specified a rating of −2 for 88 out of 91 stations, and therefore might be considered difficult to satisfy, with respect to their musical tastes.

The overall satisfaction with the present invention was computed as the average of all per-session average satisfaction values for all member sessions. For the six-week period of examination, the overall satisfaction rating was 0.64 (again, on a scale of −2 to +2). Prior to the installation of the system, the selection of music was fairly evenly distributed among three stations (Hottest Hits, Power Hits and Dance); based on the logs, it is estimated that the overall satisfaction of members would have been 0.44 during this period had the previous distribution been in effect. It is interesting that what appears to be a modest gain in the satisfaction scale is still significant enough that the vast majority of people polled report that the selection of music is better than before.

Figure 6:
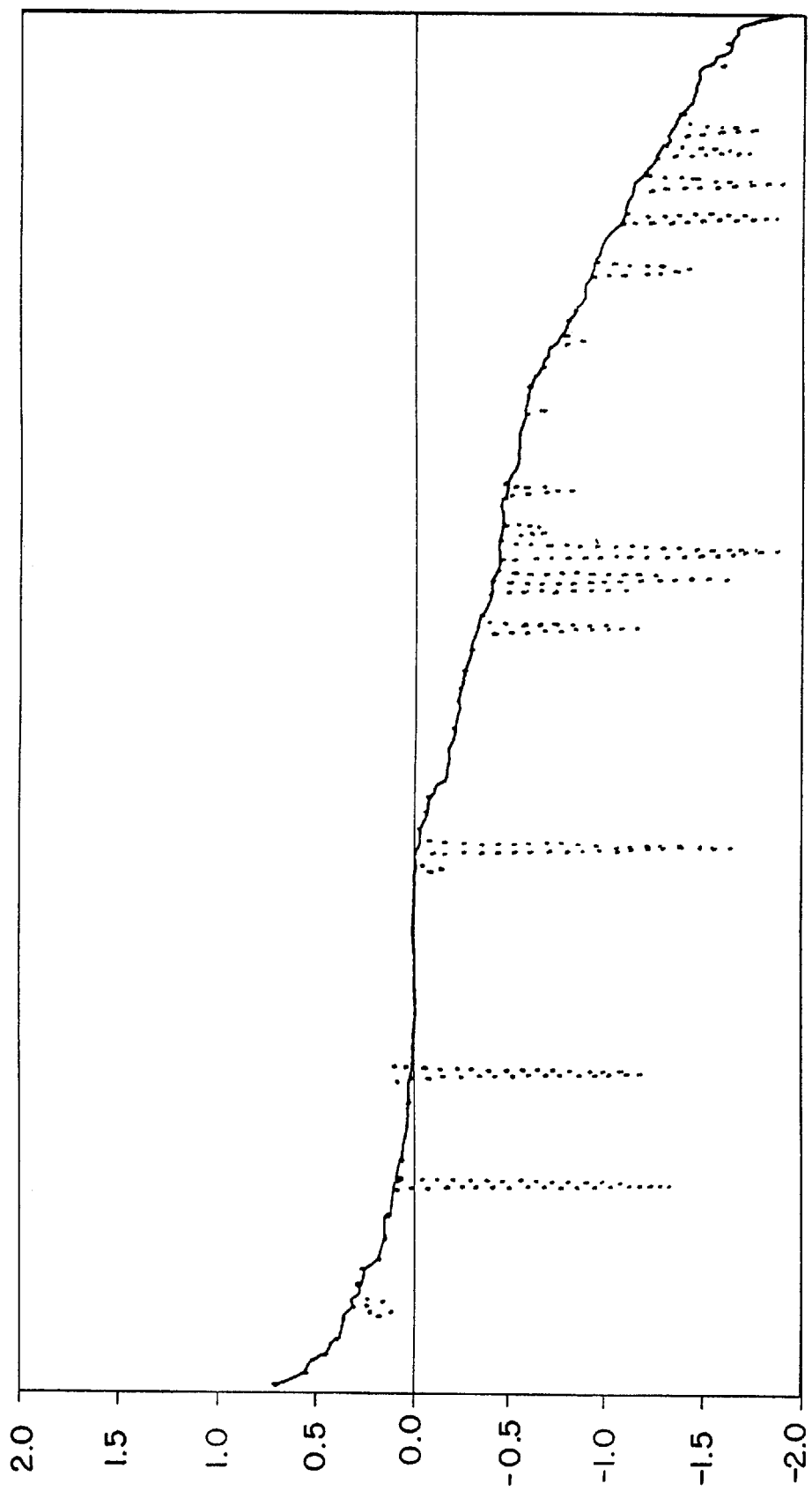
FIG. 6 is a chart showing the distribution of average members across all members, wherein the dashed lines indicate changes in preferences.

There is also interest in the distribution of people's musical preferences, i.e., how many stations people generally love, like, dislike and hate. The average preference was computed for each person by multiplying each preference rating (−2 to +2) by the number of stations with that rating, and taking the average of those values. The distribution of average members across all members is shown in FIG. 6 (the dashed lines indicate changes in preferences).

For the initial preference database, the average preference for all members was−0.38, confirming the hypothesis that people tend to hate or dislike more types of music than they love or like, at least while they are working out. Over the six week period, fitness center members tended to lower their ratings for various stations: 103 individual preference update events were logged, and the average preference for all members decreased to −0.44 at the end of this period. The three dissatisfied individuals mentioned above have the three lowest average preference levels of all members.

Statistics Gathered about Stations

The primary focus of the evaluation was on how the behavior of the present invention affected people working out in the fitness center. However, there was also interested in which stations were being played, and how well these stations were liked by the people listening to them. Therefore, statistics about the individual stations were also collected.

The first thing to find out was how often different stations were being played. FIG. 7 shows the top ten most frequently played stations, along with the percentage of time those stations were played. The three stations previously played— exclusively—in the fitness center are among the top 10 stations most often selected by the present invention (these are italicized in FIG. 7). However, it is interesting to note that the two most popular stations had not been played before, there are five stations more popular than two of the three "old" stations, and the three "old" stations are only played 23% of the time now that the present invention is selecting music.

In the first six weeks of operation, 77% of the airtime in the fitness center has been devoted to these top 10 stations. However, the system has played a variety of music, selecting 66 of the available 91 stations at least once during this period. This greatly increased variety is enjoyed by many, though not all, of the members, as shown in the features cited by members responding to the poll. It has also led to a variety of interesting situations that have been observed (or heard about) in the fitness center since the present invention was installed.

Case Studies

The community of people who work at ACTP, and who workout at the fitness center, is a technology-savvy crowd. Most members in the fitness center are quite at ease with using the member interface of the present invention, and several have shown great interest in attempting to manipulate the system to get "their" music to play.

When the system was first installed, it was recommended that the fitness center staff set the Individual Preference Filter to −1 so that the system would never select a station that was hated by one or more members present at any given time. Unfortunately, on the first day, each author separately observed a different member—at different times—who learned that whenever someone changed the rating for the currently selected station to −2, the system would change the station immediately. It was therefore recommended that the Individual Preference Filter be set to −2 (essentially, turned off). One of the aforementioned individuals was observed the next day showing off his newfound manipulative capabilities, only to be frustrated by the system no longer responding to his preference changes.

Since then, the staff has experimented a few times with setting the Individual Preference Filter to −1, but this nearly always resulted in the candidate set dwindling to one or two stations, and sometimes to zero, whenever the number of members present approached ten. Given the heavy negative bias of members' musical preferences, it appears that the Individual Preference Filter is best not used (set to −2).

Another example of members' efforts to manipulate the system was a situation in which two members decided to see if they could cause the system to select the Polka station (Polka and Opera are tied for least popular station among fitness center members). Both members changed their ratings for the Polka station from −2 to +2. However, since there were seven other people working out at that time, most of whom [presumably] had a rating of −2 for the Polka station, two people increasing their ratings was not sufficient to put Polka into the candidate set of stations considered by the present invention. In fact, Polka is among the 25 stations that have not yet been selected by the system.

One member, with rather broad musical tastes, and who tends to work out during off-peak hours, has been surprised by the responsiveness of the system. He has been treated to Brazilian Music, Flamenco Music, Hawaiian Music, and a variety of other stations that are not commonly played in the fitness center. However, when other people are present, he has in some cases changed his rating on some of these stations so that stations that are more widely popular could be played instead.

Another member observed a situation in which Chinese Music was selected during a time when few people were working out. While this genre might not normally be considered workout music, one of other people present commented favorably on the music, and expressed an interest in learning more about this type of music. The present invention thus has increased members' awareness of the variety of musical genres.

In addition to the members' experiences, the group environment staff has also had positive experiences with the system. One group environment staff member reports that complaints she has received about the music have decreased from several per day to a couple per week. Another staff member says the complaints she has received have declined from five to ten per week down to a total of three since the system was installed. Although several parameters were provided through which the staff could influence the operation of the system, two staff members reported changing system parameters only a few times, and that the default settings appear to work quite well.

The group environment staff members have been enthusiastic supporters of the system since the initial discussions began regarding plans for the present invention. Arbitrating among the diverse musical preferences of the fitness center members was one of the most dreaded aspects of their jobs; the increased satisfaction of the group environment members has translated into a big increase in the job satisfaction of the group environment staff.

Experiments

The goal is to better understand how to craft algorithms that balance the goals of popularity and fairness. This balance was evaluated based on simulations of the two algorithms described in the previous section.

The present invention has extensive logs that track events that take place in the environment. In particular, when each person has entered the fitness center, it is known what each person's preferences are at any given time, and which station has been selected at any given time. This event data can be used in the simulator, however, it was desirable to first run the algorithms on smaller sets of data so that their behavior could be better understood under more tractable conditions.

The behavior of the algorithms will now be presented using three sets of data: one corresponding to the simplified data shown in FIG. 8, another using randomly generated data with a random selection of inhabitants, and a final experiment using real data from the event log from the present invention over a one month period.

In each experiment, each inhabitant's satisfaction was measured with the option selected. For example, using the data in FIG. 8, if Deb spent four time units listening to Alternative Rock, two time units listening to Dance, and one time unit listening to Hot Country, her individual satisfaction would be $(4 \times -1)+(2 \times 2)+(1 \times 1)=-1$.

Two metrics serve as a basis for comparing the performance of the algorithms over entire populations. The first measures the popularity of options selected by an algorithm; the second measures the fairness of selected options.

Total Satisfaction. This is the sum of individual satisfaction levels for all of the inhabitants in the population.

Gini Coefficient. The Gini Coefficient is a measure of how much a given distribution of wealth (satisfaction, in this case) departs from the ideal egalitarian distribution. This statistic can be explained with reference to the so-called Lorenz curve. In plotting the Lorenz curve, satisfaction measures are sorted in an increasing order and then cumulative measures are derived. The X-axis represents the percentage of the population; the Y-axis represents the percentage of cumulative wealth. If wealth is distributed completely equitably, then the top 10% of the population owns 10% of the wealth, the top 20% owns 20% of the wealth, and so on. The ideal curve thus has a 45° slope; any deviation from this ideal curve represents a measure of inequity across the population. The Gini Coefficient measures the difference between the Lorenz curve for a given distribution of wealth and the ideal curve representing an egalitarian distribution, thus lower values represent more egalitarian distributions than higher values.

Experiment Set I

In the first set of experiments, the hypothetical data shown in FIG. 8 was used. The object was to see whether there was any measurable difference between the behavior of the algorithms when they were run with data that was constructed specifically to highlight the potential conflict between the goals of popularity and fairness. Each algorithm was run for 500 time units, tracking individual satisfaction levels.

Figure 9:
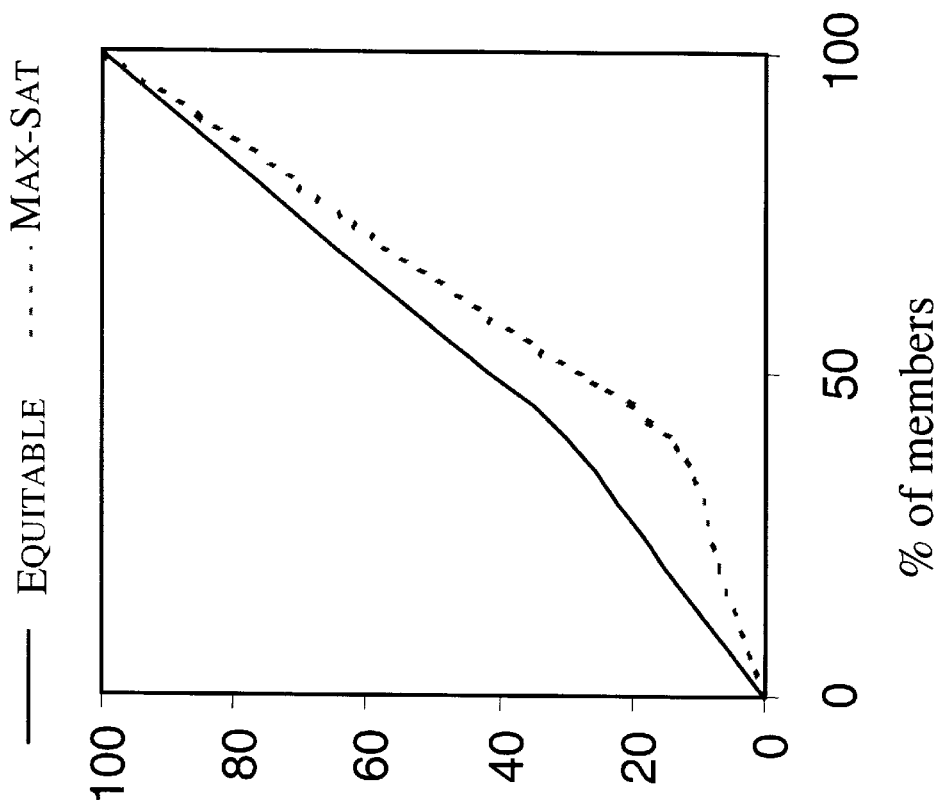
FIG. 9 shows the Lorenz curve for the performance of two algorithms on the data set of FIG. 8.

FIG. 9 shows the Lorenz curve for the performance of the two algorithms on this data set, and the table of FIG. 10 gives the statistics. As predicted, Equitable trades off lower total satisfaction (by 17.5%) for greater equitability (by 94.2%). In fact, Equitable nearly achieves a perfectly egalitarian distribution of satisfaction (a Gini Coefficient of 0.0 represents the ideal value).

Experiment Set II

Having being convinced that the Equitable algorithm achieves a much more equitable distribution of satisfaction than Max-Sat when presented with inhabitant preference data that was specially contrived to achieve this result, randomly generated preference data was experimented with. For the second set of experiments, a population of 15 people were created, each of whom were assigned randomly generated preference ratings for each of five stations. For each epoch of the experiment, 10 people were selected from this population, each were provided with the same initial allocation of cash, and ran Max-Sat for 500 time units. The cash allocation was then reinitialized for each person and ran Equitable for 500 time units. 10 epochs of the experiment were run, with the results shown in FIG. 11.

Once again, the Equitable algorithm results in a lower total satisfaction than Max-Sat (13.1% less), but achieves greater equitability of satisfaction (42.6% more). It is interesting to note that the differences in this data set are less dramatic than they are for the specially contrived data used in the first experiment.

Experiment Set III

In the final experiment, real event log data was used from the deployed the present invention to test the two algorithms. For each arrival event, a {person id, arrival time} pair was extracted from the event log, covering a period of one month, yielding a data set that includes various groupings of 166 fitness center members. As with the real system, the simulator presumes that a person departs after a fixed amount of time (90 minutes in this set of experiments). The results of this simulation are shown in FIG. 12.

As in the previous experiments, the Equitable algorithm sacrifices total satisfaction (12.0% less than Max-Sat) for increased equitability of satisfaction (31.9% more).

Discussion

In all three experiments, the Equitable algorithm led to a more egalitarian distribution of satisfaction, at the cost of a lower total satisfaction among inhabitants. Although the results were most dramatic in the first experiment, using data specially constructed to highlight the conflict between popularity and fairness, there were considerable differences seen in results from the real data set.

Alternate Embodiments

Consideration is being made to extend the concepts associated with the present invention along four different dimensions: new ways of identifying who is present in the group environment at any given time, different representations of member preferences, variations on the current group preference arbitration algorithm and new applications of this approach to other environments.

The current method of identifying member entrance and exit events is simple but inaccurate. The expected workout duration time has been set high enough so that nearly all members will have their preferences considered while they are working out. Unfortunately, this means that in most cases, members' preferences will continue to be considered by the system after they have left the fitness center. Ideally, the system could periodically poll to see who is present in the group environment or locker rooms, and not require any manual login or default timeout. One way to eliminate the manual login would be to allow members to swipe their ACTP badges through a proximity badge reader when they enter the group environment—there are already similar badge readers controlling access to the locker rooms. A more comprehensive solution to both the login and logout problem would be to use an active badge system, as described earlier.

Member preferences are represented by numerical ratings of +2 to −2 for each musical genre. This captures two types of information—whether the genre is favored or disfavored by a member, and the strength of the member's preference for that genre—in a single number. Unfortunately, there is no disincentive for a member to be "open-minded" about their preferences—a member may rate a small number of favorite genres as +2 and all the others as −2, giving such a member potentially greater influence over the music selected by the group preference agent. Other, more equitable, schemes may include allocating a maximum number of most loved and most hated stations (to force more ratings in the middle ground), or adding an additional factor to weight each member's preferences according to their distribution of preferences (e.g., members with an overwhelming proportion of −2 ratings would have their preferences discounted). Market-based schemes are also being considered for allocating preference resources.

The group preference arbitration algorithm makes its decision based on current information only. It is believed that incorporating historical information could improve its decisions. For example, a member with musical preferences that are very different from most of the other members who typically work out at the same time may experience "starvation", i.e., that member may never listen to the type of music that he or she enjoys. If the system can detect such situations, it would be able to distribute its selection of music more equitably. Another way that the history mechanism might be used is to break ties among stations in the same equivalence class by favoring infrequently played stations over frequently played stations that are at the same level of group preference. The first version of the system tracks the information that could be used for these algorithm enhancements, but the information has not yet been used.

Fitness centers are not the only environments where adaptation to musical preferences might be beneficial. Any environment in which groups of people are gathered for significant periods of time—say, more than 15 minutes— and in which it would be preferable to listen to or watch something rather than nothing is a candidate for this approach. For example, restaurants might more effectively cater to their customers by playing music that the customers really want to listen to, rather than music that the staff thinks the customers want to listen to (or music that the restaurant staff wants to listen to). Perhaps the issuance of frequent diners cards could include musical preferences as well as culinary preferences and other factors that might help make the restaurants atmosphere and service more personalized.

Music is not the only environmental factor that could adapt to a group of inhabitants. Visual displays could adapt to a group of shoppers in a store, or perhaps in a region of a store, promoting items that are likely to be of interest to the current group. User preferences in this case might be inferred from the purchase history of the shoppers rather than explicitly requested, since shopping goals vary more frequently than music preferences. In fact, shoppers might be encouraged to identify themselves to such a system— using smart cards or some special courtesy card—by the prospect of the present invention that will play the music that they want to hear while shopping.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A system for allowing a plurality of members to influence control of an environment based on preferences of the members, comprising:
   storage for storing one or more preferences of the members; and
   a controller that establishes the environment based on one or more of the preferences of at least two members present in the environment, wherein the preferences include one or more modes and each preference includes an indicia representative of a preference for at least one mode, wherein the controller determines a mean indicia for each mode to generate a percentage of time that each mode is selected by the controller.

2. The system as recited in claim 1, wherein the preferences include signal level.

3. Be system as recited in claim 1, wherein the preferences include music.

4. The system as recited in claim 1, wherein the preferences include temperature.

5. The system as recited in claim 1, wherein the controller further comprises means for adjusting the environment whenever a member leaves or arrives to optimize the environment.

6. The system as recited in claim 5, wherein the means for adjusting the environment comprises a card identification system operably connected to the controller.

7. The system as recited in claim 1 further comprising input means located outside the environment for allowing input of the one or more preferences of the members while the member is outside the environment.

8. A method for allowing preferences of members of a group environment to influence control of an element in the group environment, comprising:
   storing the preferences of one or more members; and
   controlling the element of the group environment in a manner that is optimized based on the preferences of one or more members, wherein the element includes various modes that may be selected by the controller to meet the preferences of the members of the group environment, and the preferences each include a numerical indicator representative of a preference for each mode, wherein the step of controlling further comprises:
   calculating subtotals of the numerical indicators for each mode;
   calculating a total of the subtotals; and
   dividing the subtotals by the total to govern a percentage of time that each mode is selected.

9. The method as recited in claim 8, wherein the element is an audible signal within the group environment.

10. The system as recited in claim 9, wherein the audible signal includes music.

11. The method as recited in claim 8, wherein the element is a temperature within the group environment.

12. The method as recited in claim 8, further comprising changing the element of the group environment whenever a member signals his or her arrival or departure from the group environment to best meet the preferences of the members that are present within the group environment.

13. The method as recited in claim 12, wherein the member signals arrival or departure via a card identification system.

14. The method of claim 8 further comprising receiving preferences of the members when the members are outside of the group environment.

15. The method of claim 8 wherein the element is controlled based on preferences of two or more members.

16. A method for allowing preferences of members of a group environment to influence control of an element in the group environment, the method comprising:
   identifying at least two members that ate present in the group environment;
   retrieving stored preferences associated with the members identified as being present in the group environment, wherein said preferences indicate members' preferred settings for the element;
   applying a predetermined algorithm to the retrieved preferences to determine a collective group preference of the identified members present in the group environment; and
   controlling the element in the group environment consistent with the collective group preference, wherein identifying the members that are present in the group environment includes tracking members entering or exiting the group environment and wherein a member is tracked as exiting the group environment after a predetermined time has elapsed after the member entered the group environment.

17. The method of claim 16 wherein the members are tracked by use of an active manual identification input system, a passive identification input system, or a combination of both systems.

18. The method of claim 16 further comprising determining a new collective preference when a member enters or exits the group environment.

19. The method of claim 16 wherein said algorithm includes at least one adjustable factor, and the method further comprises determining a new collective preference when the factor of said algorithm is adjusted.

20. The method of claim 16 further comprising receiving preferences of a member prior to the member entering into the group environment, and storing said preferences for later retrieval when the member enters into the group environment.

21. The method of claim 16 further comprising determining a new collective preference when the stored preferences associated with a member present in the group environment are updated while the member is in the group environment.

22. The method of claim 16 wherein the element is one or more of temperature, light level, ambient music category, audible music sound level, and décor.

23. The method of claim 22, wherein the element is ambient music category, and the algorithm includes one or more adjustable factors to allow a plurality of categories of music to be broadcast within the group environment.

24. A computer program embodied on a computer-readable medium that allows preferences of a plurality of members in an environment to influence the control of an element in the environment, comprising:
   a code segment for storing the preferences of the plurality of members; and
   a code segment for controlling the element in the environment in an optimized manner based on the preferences of at least two members present in the environment, wherein the preferences include one or more modes and each preference includes an indicia representative of a preference for each mode, wherein the controller determines a mean indicia for each mode to generate a percentage of time that each mode is selected by the controller.

25. The computer program as recited in claim 24, wherein the element is an audible signal within the group environment.

26. The computer program as recited in claim 25, wherein the audible signal includes music.

27. A method for allowing preferences of members of a group environment to influence control of an element in the group environment, the method comprising:
   identifying at least two members that are present in the group environment;
   retrieving stored preferences associated with the members identified as being present in the group environment, wherein said preferences indicate members' preferred settings for the element;
   applying a predetermined algorithm to the retrieved preferences to determine a collective group preference of the identified members present in the group environment;
   controlling the element in the group environment consistent with the collective group preference, wherein the element is ambient music category, and the algorithm includes one or more adjustable factors to allow a plurality of categories of music to be broadcast in the group environment, and wherein the collective group preference indicates a ranking of the ambient music categories, and the ambient music category is controlled by sequentially broadcasting a predetermined number of music categories having a high ranking, wherein the predetermined number corresponds to one of the adjustable factors, and
   further controlling the ambient music categories by controlling an amount of time a first music category is broadcast proportionate to the ranking of the first music category relative to the ranking of other music categories selected for broadcast.

28. A method for allowing preferences of members of a group environment to influence control of an element in the group environment, the method comprising:
   identifying at least two members that are present in the group environment;
   retrieving stored preferences associated with the members identified as being present in the group environment wherein said preferences indicate members' preferred settings for the element;
   applying a predetermined algorithm to the retrieved preferences to determine a collective group preference of the identified members present in the group environment, and
   controlling the element in the group environment consistent with the collective group preference, wherein the element is ambient music category, and the algorithm includes one or more adjustable factors to allow a plurality of categories of music to be broadcast in the group environment, and wherein one factor is a maximum amount of time that a first category of music may be broadcast without an intervening broadcast of a second category of music.

* * * * *

UNITED STATES PATENT AND TRADEMARK OFFICE
CERTIFICATE OF CORRECTION

PATENT NO. : 6,498,955 B1
DATED : December 24, 2002
INVENTOR(S) : Joseph F. McCarthy et al.

It is certified that error appears in the above-identified patent and that said Letters Patent is hereby corrected as shown below:

Column 1,
Line 52, delete "Presss," and substitute -- Press, -- in its place.

Column 2,
Line 55, delete "virtual" and substitute -- *virtual* -- in its place.

Column 9,
Line 61, delete "H," and substitute -- H. -- in its place.

Column 20,
Line 15, delete "users" and substitute -- *users* -- in its place; and in
Line 16, delete "inhabitants" and substitute -- *inhabitants* -- in its place.

Column 21,
Line 34, delete "(DMX©))" and substitute -- (DMX©) -- in its place.

Column 22,
Line 1, delete "Democratize the music selection process." and substitute -- *Democratize the music selection process.* -- in its place.
Line 7, delete "Increase the variety of music played." and substitute -- *Increase the variety of music played.* -- in its place.
Line 12, delete "Offload the music selection task from the group environment staff responsibilities." and substitute -- *Offload the music selection task from the group environment staff responsibilities.* -- in its place.
Lines 44-45, delete "group environment member interface" and substitute -- *group environment member interface* -- in its place.
Lines 47-48, delete "group environment staff interface" and substitute -- *group environment staff interface* -- in its place.

Column 23,
Line 20, delete "MxN" and substitute -- *MxN* -- in its place.
Line 21, after "where" delete "M" and substitute -- *M* -- in its place.
Line 22, after "and" delete "N" and substitute -- *N* -- in its place.
Line 24, before "and" delete "i," and substitute -- *i,* -- in its place; and after "member" delete "j," and substitute -- *j,* -- in its place.
Line 25, delete "($IP_{i,j}$)" and substitute -- ($IP_{i,j}$) -- in its place.
Line 33, delete "($GP_i$)" and substitute -- ($GP_i$) -- in its place.
Line 50, after "top", delete "m" and substitute -- *m* -- in its place.
Line 51, delete "candidate set), where m" and substitute -- *candidate set*), where *m* -- in its place.

UNITED STATES PATENT AND TRADEMARK OFFICE
CERTIFICATE OF CORRECTION

PATENT NO.    : 6,498,955 B1
DATED         : December 24, 2002
INVENTOR(S)   : Joseph F. McCarthy et al.

It is certified that error appears in the above-identified patent and that said Letters Patent is hereby corrected as shown below:

Column 23 cont'd,
Line 55, delete "(GP$_i$)" and substitute -- $(GP_i)$ -- in its place.
Line 56, after "that" delete "m" and substitute -- $m$ -- in its place.
Line 58, delete "(Pr$_i$)" and substitute -- $(Pr_i)$ -- in its place.
Line 59, delete "GP" and substitute -- $GP$ -- in its place.

Column 24,
Lines 53-54, delete "Individual Preference Update" and substitute -- *Individual Preference Update* -- in its place.

Column 25,
Line 44, after "variable", delete "m" and substitute -- $m$ -- in its place.

Column 26,
Line 54, delete "enough" and substitute -- *enough* -- in its place.

Column 27,
Line 3, delete "An event log" and substitute -- *An event log* -- in its place.
Line 7, delete "A preference log" and substitute -- *A preference log* -- in its place.
Line 10, delete "A feedback log" and substitute -- *A feedback log* -- in its place.
Line 25, delete "Date and time" and substitute -- *Date* and *time* --.
Line 26, delete "Type" and substitute -- *Type* --.
Line 27, delete "Member Ids" and substitute -- *Member Ids* -- in its place.
Line 29, delete "System parameter values:" and substitute -- *System parameter values:* -- in its place.
Line 32, delete "Station" and substitute -- *Station* -- in its place.
Line 33, delete "status of each station," and substitute -- *status of each station,* -- in its place.
Line 34, delete "(GP$_i$)" and substitute -- $(GP_i)$ -- in its place.
Line 39, delete "Reason" and substitute -- *Reason* -- in its place.

Column 28,
Line 3, delete "session" and substitute -- *session* -- in its place.
Line 8, delete "session satisfaction" and substitute -- *session satisfaction* -- in its place.
Line 58, delete "interested" and substitute -- interest -- in its place.

Column 30,
Line 53, delete "(1x1)" and substitute -- (lx-1) -- in its place.
Line 58, delete "Total Satisfaction." and substitute -- *Total Satisfaction.* -- in its place.
Line 60, delete "Gini Coefficient." and substitute -- *Gini Coefficient.* -- in its place.

UNITED STATES PATENT AND TRADEMARK OFFICE
CERTIFICATE OF CORRECTION

PATENT NO. : 6,498,955 B1
DATED : December 24, 2002
INVENTOR(S) : Joseph F. McCarthy et al.

It is certified that error appears in the above-identified patent and that said Letters Patent is hereby corrected as shown below:

<u>Column 31,</u>
Lines 22, 24, and 28, delete "Equitable" and substitute -- EQUITABLE -- in its place.
Lines 30 and 38, delete "Max-Sat" and substitute -- MAX-SAT -- in its place.
Lines 40 and 42, delete "Equitable" and substitute -- EQUITABLE -- in its place.
Lines 43 and 59, delete "Max-Sat" and substitute -- MAX-SAT -- in its place.
Line 50, after "deployed" delete "the".
Lines 58 and 62, delete "Equitable" and substitute -- EQUITABLE -- in its place.

<u>Column 33,</u>
Line 47, delete "Be" and substitute -- The -- in its place.

<u>Column 34,</u>
Line 34, delete "ate" and substitute -- are -- in its place.

Signed and Sealed this

Fifth Day of August, 2003

JAMES E. ROGAN
*Director of the United States Patent and Trademark Office*